(12) United States Patent
Ohsaki et al.

(10) Patent No.: US 6,985,938 B2
(45) Date of Patent: Jan. 10, 2006

(54) WORKFLOW IN A PAPERLESS OFFICE

(75) Inventors: Hiroyasu Ohsaki, Sagamihara (JP); Kazuyuki Tsuda, Inagi (JP)

(73) Assignee: International Business Machines Corporation, Armonk, NY (US)

( * ) Notice: Subject to any disclaimer, the term of this patent is extended or adjusted under 35 U.S.C. 154(b) by 806 days.

(21) Appl. No.: 09/951,096

(22) Filed: Sep. 12, 2001

(65) Prior Publication Data
US 2002/0032596 A1 Mar. 14, 2002

(30) Foreign Application Priority Data
Sep. 12, 2000 (JP) ............................. 2000-276954

(51) Int. Cl.
*G06F 15/173* (2006.01)
(52) U.S. Cl. ................. 709/223; 709/224; 709/238; 718/100
(58) Field of Classification Search ................ 709/218, 709/223, 224, 227, 238; 705/1, 9; 718/100
See application file for complete search history.

(56) References Cited

U.S. PATENT DOCUMENTS

| | | | |
|---|---|---|---|
| 6,341,291 B1 * | 1/2002 | Bentley et al. | 707/203 |
| 6,553,407 B1 * | 4/2003 | Ouchi | 709/206 |
| 6,574,675 B1 * | 6/2003 | Swenson | 719/316 |
| 6,606,642 B2 * | 8/2003 | Ambler et al. | 709/200 |
| 6,728,947 B1 * | 4/2004 | Bengston | 717/103 |

FOREIGN PATENT DOCUMENTS

| JP | PUPA 10-1777608 | 6/1998 |
|---|---|---|
| JP | PUPA 2000-099597 | 4/2000 |

* cited by examiner

*Primary Examiner*—Ario Etienne
*Assistant Examiner*—Avi Gold
(74) *Attorney, Agent, or Firm*—Schmeiser, Olsen & Watts; John R. Pivnichny

(57) ABSTRACT

A workflow system for a paperless office, an information processing apparatus, a method for simply defining a complicated workflow, for example, a workflow such as a circulation among a plurality of departments where the circulation route varies in each department, and a storage medium. A workflow system comprises: a manipulating computer terminal for executing a workflow between persons in charge, a computer terminal for designing the workflow by designating project variables for multiplexing a plurality of paths for nodes, each indicating a unit of operation to be handled; and a workflow server for managing the designed workflow and accessing the manipulating computer terminals in accordance with activities that indicate operations assigned to the nodes.

10 Claims, 19 Drawing Sheets

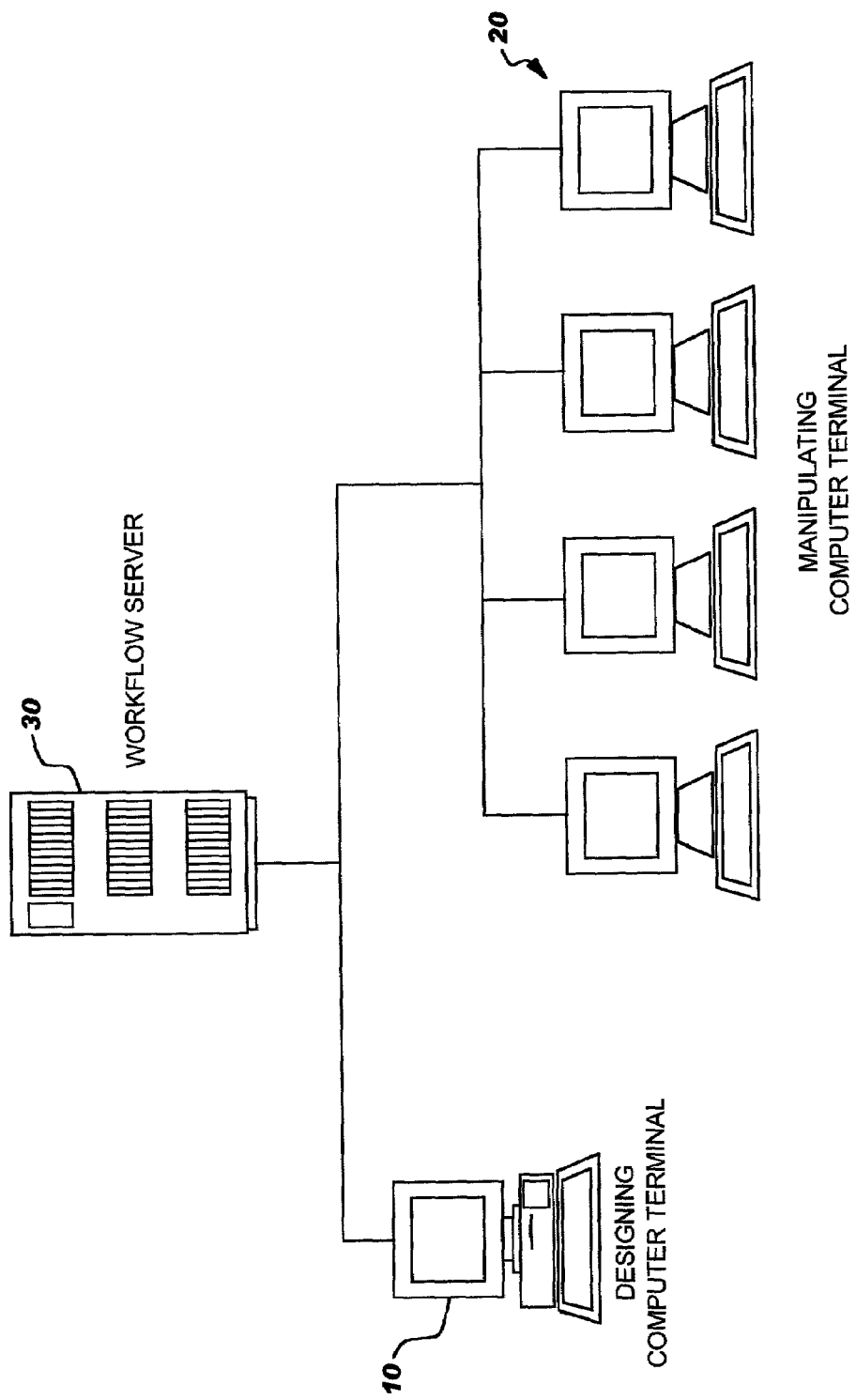

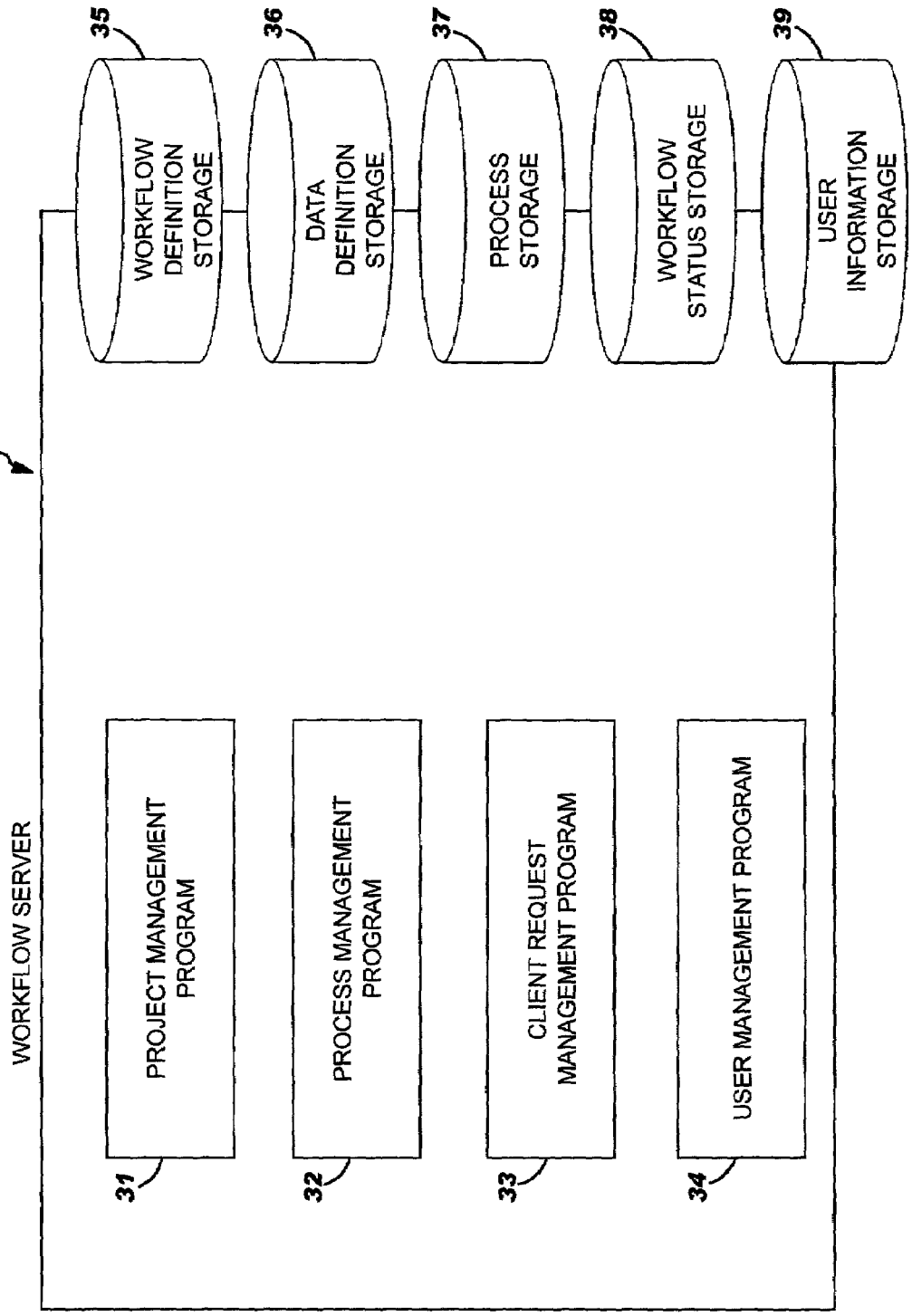

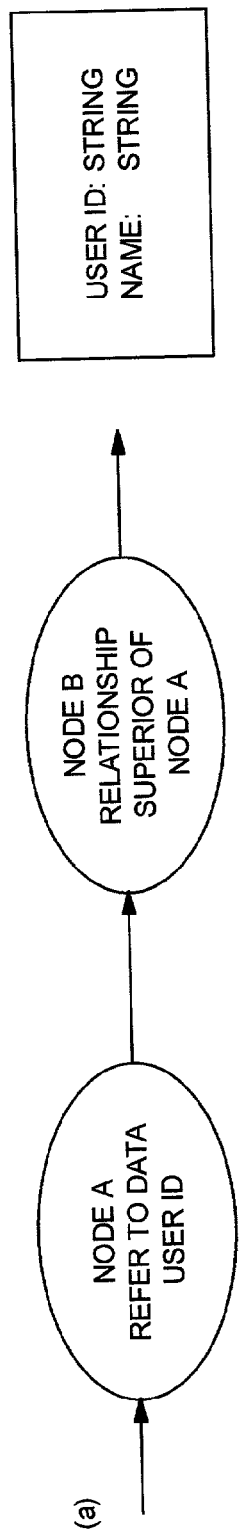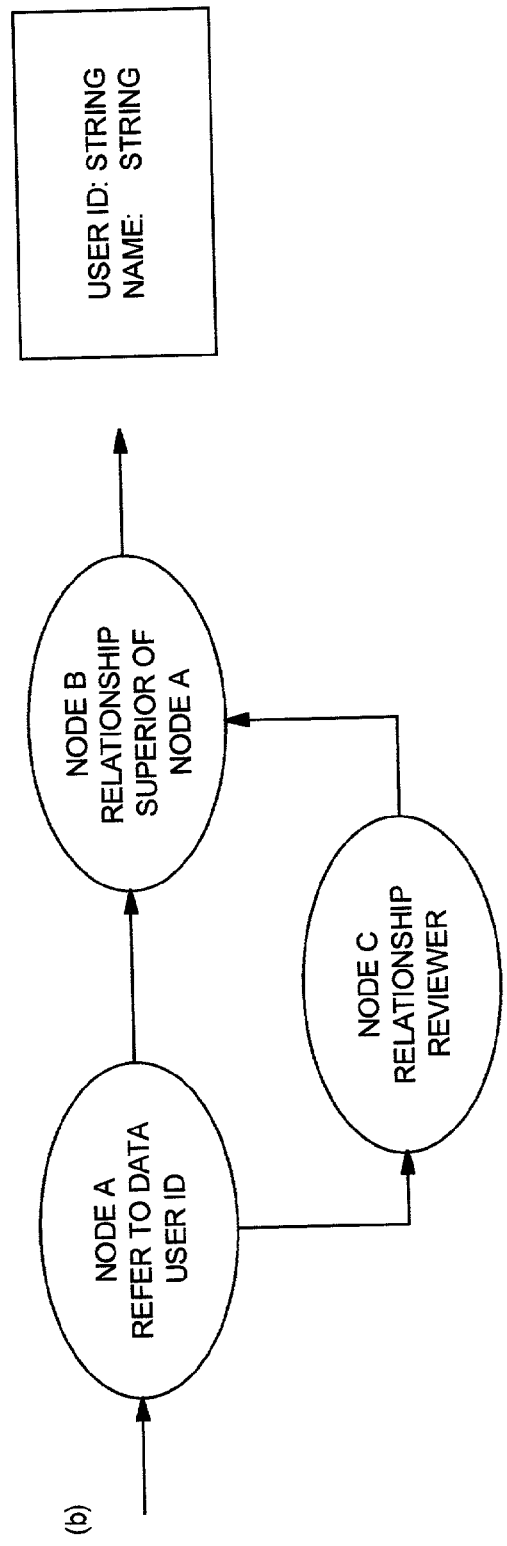
FIG. 4A
FIG. 4B

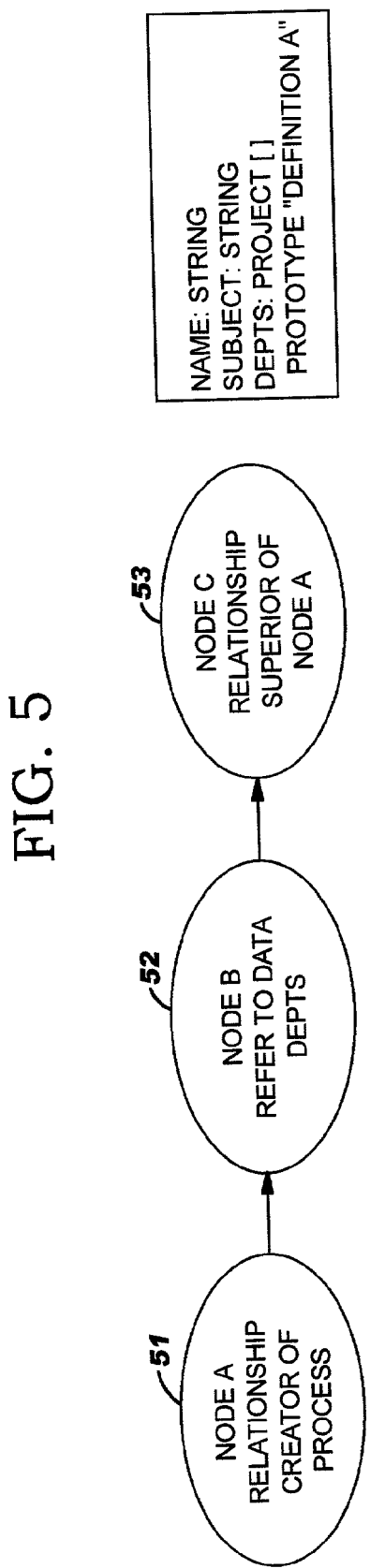

FIG. 6

| DEFINITION ID | PROCESS ID | PARENT PROCESS | ACTIVITY | EXECUTING USER | DATA | NUMBER OF CHILD PROCESSES |
|---|---|---|---|---|---|---|
| DEFINITION C | C001 | | NodeA | PERSON IN CHARGE A | Name = Subject = Depts[ ] = | |

FIG. 7

| | | GENERAL AFFAIRS |
|---|---|---|
| NAME: | H. Ohsaki | |
| SUBJECT: | APPLICATION FOR BUDGET | |
| ROUTE TO: | | |

| 1 | | GENERAL AFFAIRS |
|---|---|---|
| 2 | | ACCOUNTING |
| 3 | DEFINITION B | |
| 4 | | SALES |

FIG. 8

| SUBSTITUTION DATA NAME | SET VALUE |
|---|---|
| Name | H. Ohsaki |
| Subject | SUBJECT |
| Depts[1]. UserID | GENERAL AFFAIRS |
| Depts[2]. UserID | ACCOUNTING |
| Depts[3] | DEFINTION B |
| Depts[3]. UserID | SALES |

FIG. 10

| DEFINITION ID | PROCESS ID | PARENT PROCESS | ACTIVITY | EXECUTING USER | DATA | NUMBER OF CHILD PROCESS |
|---|---|---|---|---|---|---|
| DEFINITION C | C001 | | NodeA | PERSON IN CHARGE A | Name="H. Ohsaki" Subject="PATENT APPLICATION" Depts[1]=DEFINITION A:A001 Depts[2]=DEFINITION A:A002 Depts[3]=DEFINITION B:B001 | |
| DEFINITION A | A001 | DEFINITION C: C001 | | | UserID="GENERAL AFFAIRS" | |
| DEFINITION A | A002 | DEFINITION C: C001 | | | UserID="ACCOUNTING" | |
| DEFINITION B | B001 | DEFINITION C: C001 | | | UserID="SALES" | |

FIG. 14

| DEFINITION ID | PROCESS ID | PARENT PROCESS | ACTIVITY | EXECUTING USER | DATA | NUMBER OF CHILD PROCESSES |
|---|---|---|---|---|---|---|
| DEFINITION C | C001 | | NodeB | | Name="H. Ohsaki" Subject="PATENT APPLICATION" Depts[1]=DEFINITION A:A001 Depts[2]=DEFINITION A:A002 Depts[3]=DEFINITION B:B001 | 3 |
| DEFINITION A | A001 | DEFINITION C: C001 | NodeA | GENERAL AFFAIRS | UserID="GENERAL AFFAIRS" | |
| DEFINITION A | A002 | DEFINITION C: C001 | NodeA | ACCOUNTING | UserID="ACCOUNTING" | |
| DEFINITION B | B001 | DEFINITION C: C001 | NodeA | SALES | UserID="SALES" | |

FIG. 16

| SUBSTITUTION DATA NAME | SET VALUE |
|---|---|
| Depts[1] | DEFINITION B |
| Depts[1].UserID | User1 |
| Depts[2] | DEFINITION B |
| Depts[2].UserID | User2 |
| Depts[3] | DEFINITION A |
| Depts[3].UserID | User3 |
| Depts[4] | DEFINITION A |
| Depts[4].UserID | User4 |

WORKFLOW IN A PAPERLESS OFFICE

FIELD OF THE INVENTION

The present invention relates to improvement of workflow in an office, and more particularly to a workflow system capable of dynamically changing a route.

BACKGROUND

Although a paperless form-processing system was first proposed some time ago, it cannot be said that paperless form-processing systems are in widespread use today, due to the complexity of slip processing, problems in handling exceptional processing, and the like. To computerize a large number of slips requires a simple way of defining forms and routes, and a flexible routing function for implementing an approval system.

Related work is disclosed in the gazettes of Japanese Patent Laid-Open Nos. Hei 10(1998)-49603, Hei 10(1998)-177610 and Hei 5(1993)-216736, for example. The gazette of Japanese Patent Laid-Open No. Hei 10(1998)-49603 discloses a technique for preventing leakage of confidential information in the following manner. When data is circulated from a process A to a different process B, data to be defined by process A is set so that the data cannot be read by process B.

The gazette of Japanese Patent Laid-Open No. Hei 10(1998)-177610 discloses a technique for simplifying operations in the following manner. In a workflow system for prescribing operations to be performed by a plurality of persons in charge and passing data between the persons in charge, prescribed data conversion is executed before assigning operations to a next person in charge. Thus, documents in different forms are transmitted to the persons in charge according to the contents of the documents.

The gazette of Japanese Patent Laid-Open No. Hei 5(1993)-216736 discloses the following technique. When the destination of a computerized document (slip) varies according to the content of the document or according to the identity of an issuer of the document, a route rule and an addressee, which depend on the document to be processed, are determined by referring to an organizational directory.

As described above, conventional workflow systems may define a route for determining individual persons in charge by referring to data, and a route for designating a fixed external workflow definition, in order to dynamically change a circulation route according to data values. However, although duties for dynamically designating a department in charge are general, it is necessary to define a workflow which considers the specific case where the in-department circulation route varies for every department and also varies according to the maximum number of departments to which data is to be circulated.

In the case where a person-in-charge-level dynamic route or a workflow definition using a fixed external route and a conditional branch is used, the route becomes more complicated in proportion to the maximum number of departments to which data is to be circulated. Thus, it becomes difficult even to give an accurate definition due to the large number of combinations of flow conditions. For example, in the case where an electronic form approval system is used to circulate a form in order to get approval of a decision, frequently the form is concurrently sent to a large number of lower-level departments whose approvals must all be secured before requesting higher-level approval. However, patterns of approvals may vary according to each department. Moreover, the departments to which the form is sent vary according to its subject. Consequently, some forms may be circulated to tens of departments.

To automate such activities has heretofore required the use of an exclusive development tool or the like. However, for example as described above in designing a form to be circulated to tens of departments and an approval route, the design of a workflow is necessarily based on the assumed maximum number of departments. Thus, the display screen of the development tool becomes large and complicated, which causes not only complex user operation, but also high costs when changing designs in response to organizational changes. In order to make a complicated dynamic change in a workflow, such as switching routes, it is necessary to develop an exclusive program and execute the program halfway through the workflow.

SUMMARY OF THE INVENTION

The present invention solves the foregoing technical problems. An object of the present invention is to realize, by a simple definition, a complicated workflow, for example a workflow such as circulation of a form among a plurality of departments where the circulation route varies in each department.

Another object of the present invention is to enable adaptibility to a combination of complicated route patterns even when an exclusive program to be executed halfway through a workflow is not developed.

To accomplish the foregoing objects, the present invention provides a mechanism for dynamically changing a sub-route in a route definition by designating a project variable as a node. Moreover, the present invention enables multiplexing and treating a synchronous type parallel route as one node by designating an array type variable as the project variable.

According to an aspect of the present invention, a workflow system for passing data between persons in charge who use computer terminals in accordance with a workflow via a network to which the computer terminals are connected, comprises: designing means for designing the workflow by creating projects, each of which consists of a workflow definition and a data definition to be referred to by the workflow definition, the workflow definition defining nodes indicative of operations to be assigned to the persons in charge and paths for determining a processing order of the nodes; storing means for storing the created projects; and process managing means for managing processes, each indicating a unit of duties of the workflow by using the stored projects to assign the operations to the persons in charge.

In the workflow system, data is defined by a project type and an array of the project type. Preferably, the designing means designs the workflow by handling the projects, each having the array whose elements are of different kinds. As a result, a complex workflow definition can be simplified based on using the project.

According to another aspect of the present invention, a workflow system comprises: manipulating computer terminals for executing a workflow between persons in charge, the manipulating computer terminals being connected to a network; a designing computer terminal for designing the workflow by designating project variables for multiplexing a plurality of processes for nodes, each indicating a unit of operations to be handled; and a workflow server for managing the designed workflow and providing access to the manipulating computer terminals in accordance with activities that indicate operations assigned to the nodes. Herein, the term "processes" refers to a unit of duties of the workflow. For example, an "August business report" and a "September business report" are different processes, but these processes are regarded as a project that indicates the same "business report". Therefore, in this case, the same route pattern is used for the above-mentioned processes, even though these processes differ from each other in their contents. In this example, processes are different in the same project. However, the processes to be multiplexed as a node may consitute in different projects as well.

In the workflow system, the project variables are designated by using a workflow definition of the nodes and paths for determining the processing order of the nodes, and a data definition to be referred to by the workflow definition. This is effective in determining resources such as a route and a field definition, for example.

Preferably, definition IDs for identifying the project variables are defined as attributes of the project variables. The workflow server may store information concerning the project variables by using the definition IDs, as a project may be uniquely selected to reuse resources such as a route and a field of another project.

Furthermore, the manipulating computer terminals inform the workflow server of the termination of the activities after the execution of the assigned operations, and the workflow server completes the process after the termination of all the activities of the workflow.

According to the present invention, an information processing apparatus such as a workflow server connected via a network to a plurality of computer terminals for executing a workflow, comprises: project managing means for managing projects, each of which includes a workflow definition comprising a plurality of nodes and paths for connecting the plurality of nodes and a data definition to be referred to by the workflow definition by using definition IDs for uniquely defining the projects; process managing means for managing processes, each indicating a unit of duty of the workflow by using the managed projects; and user managing means for providing an access to the computer terminals in accordance with the managed processes.

According to the present invention, an information processing apparatus including a computer terminal or the like for defining a workflow involving computer terminals connected to a network, comprises: workflow definition determining means for selecting nodes, which indicate duties to be assigned to executors in charge of workflow, and connecting paths, which determine the processing order of the nodes, thereby determining a workflow definition; data defining means for defining executing users for the selected nodes and for defining conditions for making the paths effective; and register instructing means for giving an instruction to add information capable of specifying the workflow definition and data definition (for example, a definition ID that uniquely specifies a project by identifying the project's workflow definition and the data definition) to the determined workflow definition and the defined data definition, and to register the definition ID.

According to an aspect of the present invention, a method for defining a workflow using a plurality of computer terminals connected to a network, comprises the steps of: selecting nodes that indicate duties to be assigned to executors in charge of workflow; selecting a project array type node for multiplexing a process, a route pattern, and a data set as one of the selected nodes; connecting the selected nodes to the selected project array type node by using paths; and selecting, for example, a project to be arranged according to the selected project array type node.

In the method for defining a workflow, the project can be a unit that includes in combination a workflow definition that includes a plurality of nodes and paths for connecting the plurality of nodes, and a data definition that can be set and referred to by the process indicating a unit of duties of the workflow. Preferably, the selected project has an array whose elements are of different kinds, because a parallel route can be multiplexed by one node by designating the array type variables.

According to another aspect of the present invention, a method for defining a workflow to be executed by a plurality of computer terminals connected to a network, comprises the steps of: introducing a node that includes of a project type variable capable of handling a combination of a data set and a route integrally, as one node of the workflow; and designating the project type variable as an array, thereby treating as one node a plurality of child processes (subprocesses) to be branched synchronously.

In the method for defining a workflow, a default prototype is used in the absence of an explicit setting as the project type variable. Moreover, the term "child process (subprocess)" used herein means both a route pattern and the data set.

In a storage medium of the present invention, which stores a program to be executed by a computer so that inputting means of the computer can read the program, the program causes the computer to execute the steps of: selecting nodes that indicate duties to be assigned to executors in charge of workflow; selecting a project array type node for multiplexing a process, a route pattern, and a data set as one of the nodes; connecting the nodes to the project array type node by using paths; and selecting a project to be arranged according to the project array type node.

A program stored in another storage medium of the present invention causes a computer to execute the steps of: introducing a node that includes a project type variable capable of handling a combination of a data set and a route integrally, as one node of a workflow; and designating the project type variable as an array, thereby treating as one node a plurality of child processes to be branched synchronously. A medium such as a CD-ROM may be the storage medium.

A program transmitting apparatus which the present invention is applied to, comprises: storing means for storing a program for causing a computer to execute the steps of selecting nodes that indicate duties to be assigned to executors in charge of workflow; selecting a project array type node for multiplexing a process, a route pattern, and a data set as one of the selected nodes; connecting the nodes to the project array type node by using paths; and selecting a project to be arranged according to the project array type node; and transmitting means for reading out the program from the storing means and transmitting the program.

Another program transmitting apparatus which the present invention is applied to, comprises: storing means for storing a program for causing a computer to execute the steps of introducing as one node of a workflow a node that includes a project type variable capable of handling a combination of a data set and a route integrally, and designating the project type variable as an array, thereby treating as one node a plurality of child processes to be branched synchronously; and transmitting means for reading out the program from the storing means and transmitting the program.

BRIEF DESCRIPTION OF THE DRAWINGS

For a more complete understanding of the present invention and the advantages thereof, reference is now made to the following description taken in conjunction with the accompanying drawings.

FIG. 1 is an illustration of a general configuration of a workflow system which an embodiment of the present invention may be applied to.

FIG. 3 is an illustration of a general configuration of a workflow server.

FIGS. 4(a) and 4(b) are illustrations of examples of registered projects.

FIG. 5 is an illustration of an example of a definition created by a process defining method.

FIG. 6 is an exemplary table showing the status of a process storage.

FIG. 7 is an illustration of an example of an operation screen for a workflow operation to be obtained by an operator.

FIG. 8 is a table of data to be transmitted to a client request management program.

FIG. 14 is a table of a status of the process storage obtained by the execution of the operations shown in FIGS. 11, 12 and 13.

FIG. 16 is an illustration of the case where other data is designated as the data of "Route to:" shown in FIG. 7.

DETAILED DESCRIPTION

The present invention will be described in detail below by referring to an exemplary embodiment shown in the accompanying drawings.

First, some of the terms used in describing the embodiment will be defined.

Workflow Definition:

A workflow definition refers to a definition that includes a plurality of nodes and paths for connecting the nodes.

Node:

A node refers to a unit of an operation definition included in the workflow definition. An actual operator and a data input screen are assigned to a node.

Data Definition:

A data definition refers to a definition of data which a process can set and refer to. The data definition defines a data name, a data type, or a data array. The data type includes a character string type and a numerical value type.

Data Attribute Definition:

A data attribute definition refers to a definition of an attribute for limiting a value of data and forms a part of the data definition. The attribute of character type data includes a limit on the number of characters, and so on. The attribute of numerical value type data includes designation of a range, and so on.

Project:

A project refers to a unit of a combination of the workflow definition and the data definition. The project is equivalent to a process definition. The project is identified by a definition ID. When the project is determined, the workflow definition and the data definition are also determined.

Process:

A process refers to a unit of duties of a workflow. The process corresponds to an embodied project. The duties of the process are performed according to a route pattern indicated by the workflow definition of the project which the process is based on. Moreover, a data set indicated by the data definition stores the contents varying according to the process.

Activity:

An activity refers to an operation assigned to a node. When an operator is assigned to an activity, the operator is to operate the activity.

Next, an exemplary embodiment will be specifically described. As an aid to understandings, the exemplary embodiment will be first described with reference to examples of applications.

Figure 18:
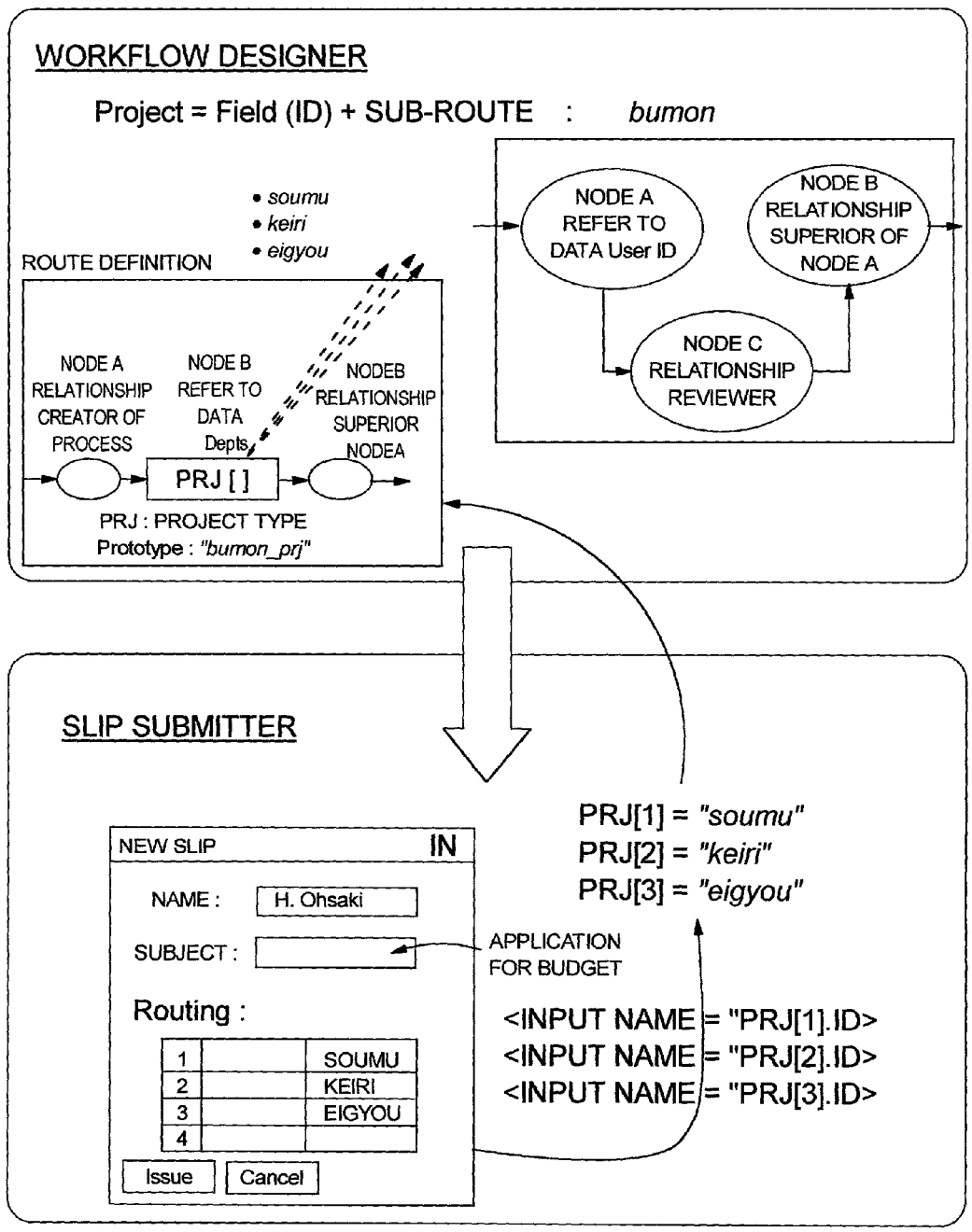
FIGS. 18(a) and 18(b) are illustrations of an example of operations to be performed by a workflow designer and a slip submitter.

FIGS. 18(a) and 18(b) are illustrations of an example of manipulations to be performed by a workflow designer and a slip submitter, showing a simple example which the embodiment may be applied to.

To multiplex the same route pattern, the workflow designer sets a node so that the node may refer to a project type array variable PRJ [ ], as shown in FIG. 18(a). In this case, a definition ID "bumon(department)_prj" of a project is set as a prototype attribute of PRJ (to be adopted in the absence of explicit setting). The expresssion "Project=Field (ID)+Sub-route: bumon" shown in FIG. 18(a) means that "A node for referring to project type data generates and executes child processes as an activity of the node by using a definition of a project referred to by the node. Also to generate and execute child processes using the same project "bumon", the node can circulate data to different users (or departments) by separately setting IDs of the child processes, that is, the name data thereof."

As shown in FIG. 18(b), a user who submits a form enters IDs (soumu (general affairs), keiri (accounting) and eigyou (sales)) of departments which should dynamically give an approval at the time when the user submits the slip. The IDs are linked to variable IDs of array elements of the variable PRJ by an INPUT tag shown in FIG. 18(b). Data values are substituted in the following manner. Since bumon_prj is set as the prototype attribute of the project, child processes created as the activity of the node by using the project of a project definition ID (bumon_prj) are set, and then the values are set to data in the child processes, that is, the variable IDs. To operate a slip as duty processing, the node generates as many child processes as array elements and executes the child processes in parallel, because the node is set so as to refer to a project type array. A route defined by the project bumon_prj is used, and a head node is set by a data reference designation so as to refer to IDs, that is, name data. Thus, ID="soumu", ID="keiri" and ID="eigyou" are evaluated. Then, data is transmitted to the departments and approved by the respective persons in charge in the departments. Thus, a series of workflows can be realized in the above-described manner.

To multiplex different route patterns, the workflow designer sets a node in the same manner so that the node may refer to the project type array variable PRJ [ ]. Then, a user who submits a slip enters definition IDs (soumu_prj, keiri_prj and eigyou_prj) of a project for departments which should dynamically give an approval at the time when the user submits the slip. The IDs are set as separate projects in the array elements of the variable PRJ by the INPUT tag. To operate the slip, the node generates as many child processes as array elements and executes the child processes in parallel, because the node is set so as to refer to the project type array. At this time, the different project IDs (soumu_prj, keiri_prj and eigyou_prj) are evaluated, and different types of child processes are set. Routes defined by the separate projects are used, and data is transmitted to the departments by using the separate routes to be approved by the respective persons in charge in the departments. The child processes go to a next node in synchronization with one another. A workflow using multiplexed different route patterns is realized in the above-described manner.

The same parent project can be used as a parent project including a substantial route design of the above-mentioned flow to multiplex the same route pattern and to multiplex different route patterns.

As described above, in the exemplary embodiment, a structural unit of an application that includes of a plurality of resources such as the workflow definition, the data definition, a display format, and a linked program is called a project. In this concept of "project", the project ID which may be of a project name or the like is adopted in order to uniquely determine name spaces of resources such as elements including nodes in the workflow definition and variable names defined by the data definition. Moreover, the concept of "project type data" is introduced into the project in order to reuse the resources such as the workflow definition and the data definition of another project. A node is set by the workflow definition so as to refer to the project type data, whereby the so-called "child processes" are realized. Furthermore, the project type data is defined as an array type, whereby the child processes are realized in parallel. The above-mentioned concepts enable a flexible control of the child processes and data in the child processes.

Next, the exemplary embodiment will be described in detail starting with the configuration of the whole system.

FIG. 1 is an illustration of a general configuration of a workflow system which the present invention may be applied to. The workflow system of the exemplary embodiment includes a designing computer terminal 10 for designing a workflow, manipulating computer terminals 20 for operating the workflows provided for persons in charge who perform duties, and a workflow server 30 for storing various types of programs for executing the workflows. The designing computer terminal 10, the manipulating computer terminals 20, and the workflow server 30 are connected to one another and form a network.

The designing computer terminal 10 includes functions for designing the workflow and definition functions for realizing duty processing by the workflow system. A user who defines duty processing uses the designing computer terminal 10 to define a procedure of the duty processing for the workflow system. The manipulating computer terminals 20 have functions for executing previously-designated duties. The manipulating computer terminals 20 are arranged so that a plurality of persons in charge of duties may use the manipulating computer terminals 20.

A designer uses the designing computer terminal 10 to enter his or her identification information and thus log on the workflow system. Moreover, the designer uses the functions for designing the workflow to design a flow of operations of duties to be performed and a data structure for use in the operations.

Figure 2B:
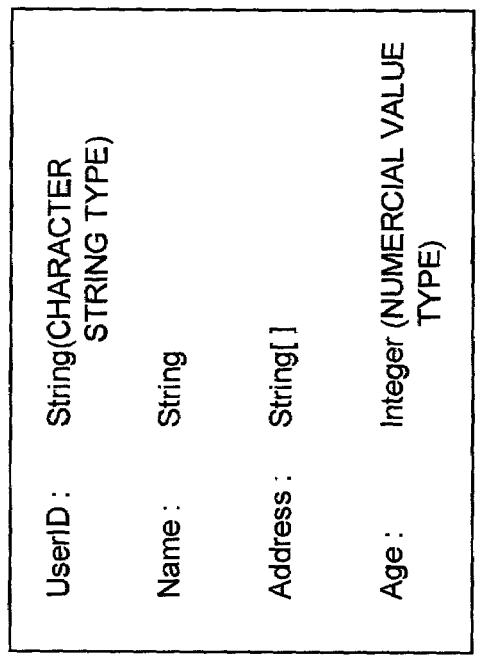
FIGS. 2(a) and 2(b) are illustrations of a project (process definition) expressing a flow of processing of operations to be performed.
Figure 2A:
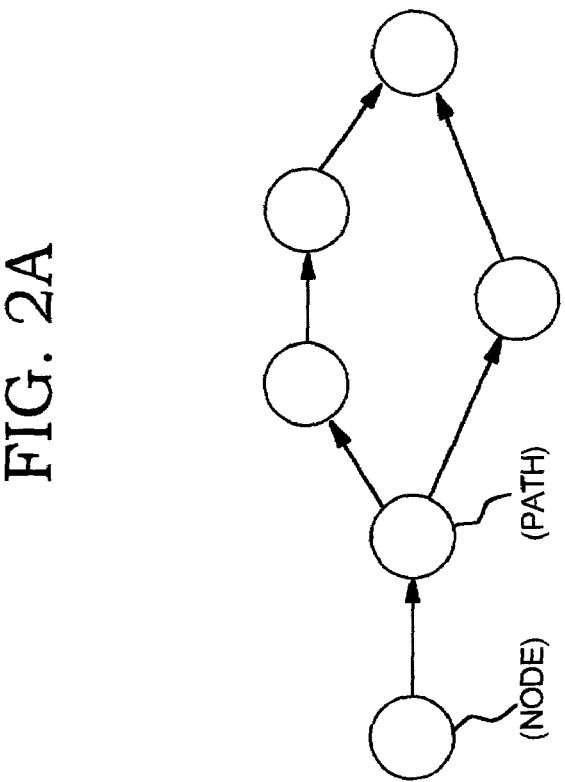

FIGS. 2(a) and 2(b) are illustrations of a project (process definition) expressing the flow of the operations of the duties to be performed. FIG. 2(a) shows an example of the workflow definition. FIG. 2(b) shows an example of the data definition to be referred to by the workflow definition. In FIG. 2(a), circles are called nodes and indicate duties to be assigned to persons in charge (persons in charge of duties). Arrows are called paths and indicate the order of processing duties, that is, a connection of operations. In the exemplary embodiment, it is assumed that all the nodes refer to a single data definition and that passing of necessary data between processes is performed according to the paths indicated by the arrows. However, a plurality of data definitions may be present, and passing of different data may be defined by the paths. In FIG. 2(b), "String (character string type)" is defined as a User ID and a Name, "String [ ]" is defined as an Address, and "Integer (numerical value type)" is defined as an Age.

The designer using the designing computer terminal 10 uses a design tool to arrange the nodes and to connect the paths in order to determine the processing order. The attributes of the nodes and the paths can be prescribed. The names of the nodes and persons in charge, that is, executing users, are defined as the attributes of the nodes. Types of assignment of the executing user include a direct designation for directly inputting the user ID, a relationship designation defined by the relationship between an operating user and another operating user (for example, a relationship between an operating user of a node A and a superior of the operating user, and the like), and a data reference designation for taking values of data defined by the data definition shown in FIG. 2(b) as an operating user. Conditions for enabling the paths are defined as the attributes of the paths. A project created by the designing computer terminal 10 as described above is registered in the workflow server 30. At this time, the definition ID capable of uniquely specifying the project is additionally registered in the workflow server 30. Each flow of separate duties created from the project corresponds to a process. Each of the operations forming the process, that is, an operation assigned to each person in charge, corresponds to an activity.

A person in charge uses one of the manipulating computer terminals 20 to enter his or her identification information and thus log on the workflow system. Each person in charge refers to the workflow definition shown in FIG. 2(a), thereby creating a new process, or viewing an activity assigned to him or her and executing a designated operation. An operation assigned to each person in charge corresponds to a node of the workflow definition shown in FIG. 2(a). Upon completion by the person in charge, an operation is assigned to a next person in charge according to the paths of the workflow definition.

FIG. 3 is an explanatory illustration of a general configuration of the workflow server 30. The workflow server 30 comprises managing means: a project management program 31, a process management program 32, a client request management program 33, and a user management program 34. Moreover, the workflow server 30 also comprises storing means: a workflow definition storage 35, a data definition storage 36, a process storage 37, a workflow status storage 38, and a user information storage 39. The above-mentioned storing means may be located anywhere in the network.

The project management program 31 causes the workflow definition storage 35 and the data definition storage 36 to retain data on the workflow definitions and the data definitions of projects defined by the designer using the designing computer terminal 10. Thus, the project management program 31 manages the retained data. The projects are respectively identified by the definition IDs. The registration of a new definition and the correction of an existing definition are managed by the project management program 31 using the definition ID. When a person in charge creates a new process, the project management program 31 creates a list of processes which the person in charge can create, by using the data stored in the workflow definition storage 35 and the data definition storage 36.

The process management program 32 manages the process created by using the definition of the project. The process has a definition ID, and a process ID for identifying a plurality of processes created by the same definition. A combination of the definition ID and the process ID manages a process. The process storage 37 stores an activity under execution, the identification of a person in charge (including an executing user) who executes or should execute the activity, and data used in the process. When an activity ends, it is assigned to a next person in charge in accordance with the above-mentioned information. The process management program 32 writes an event status on the workflow status storage 38 at each time of the occurrence of an event such as the creation of the process, the assignment of the activity, or the completion of the process.

The client request management program 33 includes functions for honoring requests from persons in charge who use the manipulating computer terminals 20. The client request management program 33 also includes functions for providing a person in charge with a list of activities that are currently assigned to the person in charge (that is, activities which an executing user is a person in charge) and for honoring a request to terminate the activity assigned to the person in charge. Moreover, the client request management program 33 provides an operating status of a process by using information remaining in the workflow status storage 38.

The user management program 34 controls the authorization of persons in charge to participate in the workflow system. Thus, the user management program 34 registers user information in the user information storage 39 and makes access to the user information as needed. When a new user attempts to log on the system by using the manipulating computer terminal 20, the user management program 34 checks an ID and a password entered by the user. The user information storage 39 retains information such as organizations which users belong to, hierarchical structures of the organizations, relationships between the users and their superiors, and the range of the authorities of the users. Reference is made to the information to assign a person in charge to a next activity. The information to be referred to varies according to the attribute of the node of the workflow definition as shown in FIG. 2(a), for example.

Next, operation of the workflow system of the exemplary embodiment will be described.

FIGS. 4(a) and 4(b) are illustrations of an example of a registered project. In this case, it is assumed that a project "definition A" and a project "definition B" are previously registered. The projects are registered as a unit of a combination of the workflow definition and the data definition, as mentioned above.

In the project "definition A" shown in FIG. 4(a), when a process using the project "definition A" is started, a person in charge of an activity corresponding to the Node A is first assigned to a person who is substituted for process data User ID. After the end of the activity, an activity corresponding to a Node B is assigned to a superior of the user who has executed the activity of the Node A.

In the project "definition B" shown in FIG. 4(b), when a process using the project "definition B" is started, the person in charge of the activity corresponding to the Node A is first assigned to the person who is substituted for the process data User ID. After the end of the activity, a person in charge of an activity of a Node C is assigned to a person who is substituted for process data Reviewer. Furthermore, a person in charge of the activity corresponding to the Node B is assigned to the superior of the user who has executed the activity of the Node A. The project "definition A" has a "definition A" as the definition ID, and the project "definition B" has a "definition B" as the definition ID, respectively.

FIG. 5 is an illustration of an example of a definition created by an exemplary process defining method. First, the designer creates the definition shown in FIG. 5 by using the design tool of the designing computer terminal 10. In this example, a project array type node 53 is provided between a typical node 51 and a typical node 52. The Node B of the workflow definition of a project "definition C" shown in FIG. 5 and Depts of the data definition thereof correspond to the defining method to be adopted by the exemplary embodiment. The assignment of a user to the Node B is performed by referring to data in the same manner as the conventional definition, but the type of data to be referred to is defined as a project type array.

A process created from another project is substituted for an element of the project type array as the value of the process. It should be noted that the process of the project "definition A" is substituted in the absence of explicit setting of the definition ID because the "definition A" is given to Depts as the prototype attribute. The above-mentioned definition means that a process indicated by the project type data Depts is substituted when the activity of the Node B is enabled, and means that a plurality of other processes are simultaneously started as the activity when the project is defined by the array. The defined project is transmitted to the workflow server 30 and is retained in the workflow definition storage 35 and the data definition storage 36 via the project management program 31. In this case, it is assumed that a "definition C" is given and retained as the definition ID.

In the workflow system of the exemplary embodiment, when a person in charge A creates a new process as a new workflow by using the project "definition C" shown in FIG. 5, a request for a new creation is sent to the client request management program 33 of the workflow server 30. Upon receipt of the request, the client request management program 33 requests the process management program 32 to create a new process. Then, the "definition C" and "C001" are set in the process storage 37 as the definition ID and the process ID, respectively, and thus a new process is created and retained in the process storage 37.

FIG. 6 is a table of an example of a status of the process storage 37. Since the individual processes in the process storage 37 are identified by the combination of the definition ID and the process ID, as the identification representation, "definition C: C001" is described. A request to start the process is also sent to the process management program 32 via the client request management program 33, and thus the "Node A" and the "person in charge A" are set as the activity and the executing user, respectively.

In the status shown in FIG. 6, when the person in charge A logs on the workflow system by using the manipulating computer terminal 20, the person in charge A can determine the activity "Node A" of "definition C: C001" assigned to the person in charge A as the executing user. When the person in charge A requests the system to start the activity by using the terminal, a linked program is activated and thus the person in charge A can obtain an operation screen.

FIG. 7 is an illustration of an example of an operation screen for a workflow manipulation to be obtained by a person in charge. FIG. 8 is a table of data to be transmitted to the client request management program 33. In this case, set values are determined according to data names to be substituted. The operation screen shown in FIG. 7 has data entry areas for the data structure defined by the data definition of the project "definition C". In the example shown in FIG. 7, text entry areas indicated by labels "Name:" and "Subject:" are linked to data names to be substituted "Name" and "Subject" of the data structure of the project "definition C", respectively, as shown in FIG. 8. The first column in the first row of a table indicated by a label "Route to:" shown in FIG. 7 is linked to "Depts[1]" shown in FIG. 8, and the second column is linked to a data name "Depts[2]. UserID". In the same manner, the first and second columns in the second row or later are linked to data names "Depts[n]" and "Depts[n]. UserID", respectively. As described above with reference to FIG. 5, in this example, the process of the project "definition A" is substituted for "Depts[1]" and "Depts[2]" having no explicit setting of the definition ID because the "definition A" is given as the prototype attribute. When the person in charge A determines the operation by entering information on the manipulation screen as shown in FIG. 7, the information is transmitted to the client request management program 33 of the workflow server 30 in a form as shown in FIG. 8.

Figure 9:
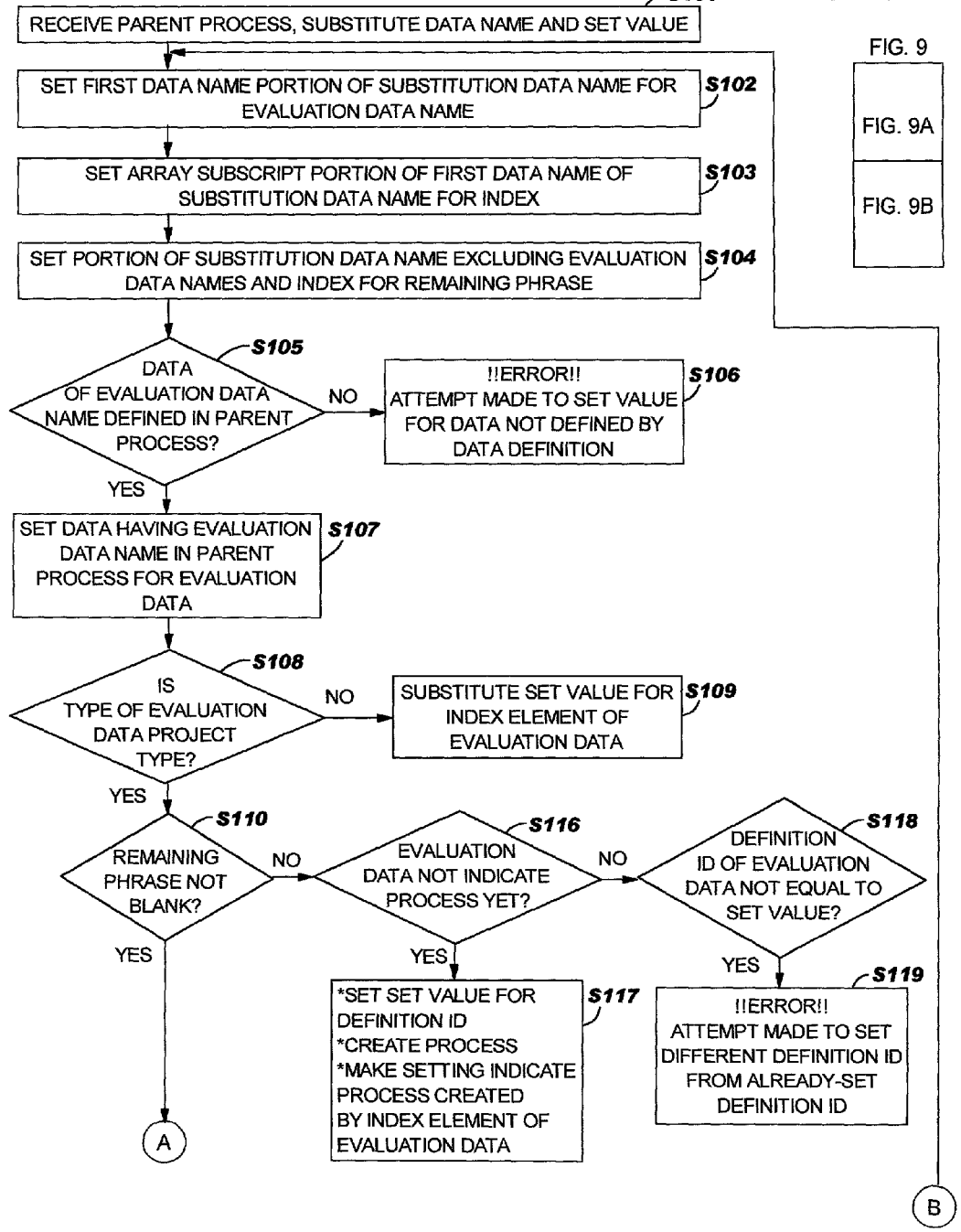
FIG. 9 is a flowchart of a procedure for evaluating data setting to be executed by the client request management program.

FIG. 9 is a flowchart of a procedure for evaluating data setting to be executed by the client request management program 33. The description is given with regard to an example of data setting in the first row of "Route to:" on the entry screen shown in FIG. 7. In this example, the substitution data name to be substituted, which is previously assigned to the entry on the entry screen is "Depts[1]. UserID", and the input value "soumu" is taken as the set value. This is the set entry corresponding to the third row shown in FIG. 8.

First, when the client request management program 33 receives a request to set the value, an evaluation logic is called using the current process "definition C: C001" as a "parent process" (step S101). Then, the first data name portion of the data name to be substituted is set for "Evaluation data name" (step S102). Then, an array subscript portion of the first data name of the data name to be substituted is set for "INDEX" (step S103). Then, a portion of the substitution data name excluding Evaluation data name and INDEX is set for "Remaining phrase" (step S104). Since the substitution data name is "Depts[1]. UserID", "Depts", "[1]" and "UserID" are obtained as "Evaluation data name", "INDEX" and "Remaining phrase", respectively.

Then, a judgment is made as to whether or not the data of the evaluation data name is defined in the parent process (step S105). When the data is not defined, this means that an attempt is made to set a value for data not defined by the data definition, and therefore an error is detected (step S106). When the data is defined in step S105, data having the evaluation data name in the parent process is set for "Evaluation data" (step S107). Since "Depts" is defined by the data definition of the project "definition C" of the process, the value thereof is taken as "Evaluation data".

Then, a judgment is made as to whether or not the type of the evaluation data is the project type (step S108). When the type is not the project type, a set value is substituted for the INDEX element of the evaluation data (step S109). When the type is the project type, a judgment is made as to whether or not the remaining phrase is blank (step S110). In the above-mentioned example, the evaluation data "Depts" in step S106 is defined as "Project [ ]" by the data definition of "definition C", and thus it turns out that the array is the project type array. Since "UserID" is set for "Remaining phrase", "Remaining phrase" is not blank.

When "Remaining phrase" is not blank in step S110, a judgment is made as to whether or not "Evaluation data" indicates a process (step S111). In this example, when a check is made as to whether or not "Evaluation data" indicates the process, the data of "definition C: C001" shown in FIG. 6 indicates that the process is not yet indicated in this status, and thus the operation goes to a check of the prototype attribute. That is, a judgment is made as to whether or not the prototype attribute is defined for the evaluation data (step S112). When the prototype attribute is not defined, this means that an attempt is made to make a direct access to internal data without setting the definition ID for the internal data of data whose prototype attribute is not defined, and therefore an error is detected (step S115). In this example, the prototype attribute of the evaluation data "Depts" is defined as "definition A" by the data definition of "definition C". Therefore, the prototype attribute is set for the definition ID, a process is created, and setting is made so as to indicate the process created by the INDEX element of the evaluation data (step S113). That is, the process is created from the project whose definition ID is "definition A", and the process having "definition A" and "A001" as an identifier is retained in the process storage 37. Moreover, "definition A: A001" is set for the "INDEX" element of "Evaluation data", that is, "Depts[1]" so as to indicate the process.

Then, the process indicated by the "INDEX" element of "Evaluation data" is set for the parent process, and the remaining phrase is set for the data name to be substituted (step S114). In this example, the process "definition A: A001" indicated by the "INDEX" element of "Evaluation data", that is, "Depts[1]" is set for "Parent process", and "Remaining phrase", that is, "UserID" is set for "Data name to be substituted". After that, the operation jumps to step S102. When the evaluation data indicates the process in step S111, the operation goes directly to step S114.

When further evaluation is made, "UserID" is obtained as "Evaluation data name" (step S102), "" (blank character) is obtained as "INDEX" (step S103), and "" (blank character) is obtained as "Remaining phrase" (step S104). Since "UserID" is defined by the data definition of the project "definition A" of the process (step S105), the value thereof is taken as "Evaluation data" (step S107). Since the "INDEX" element of "Evaluation data", that is, "UserID" is defined as "String" by the data definition of "definition A", it turns out that the type is the character type, not the project type (step S108). Therefore, the set value "soumu" is set for the data "UserID" of the process "definition A: A001" that finally indicates whether or not the process is "Parent process" (step S109).

When the remaining phrase is blank in step S110, a judgment is made as to whether or not "Evaluation data" indicates a process (step S116). When "Evaluation data" does not indicate the process, the set value is set for the definition ID, the process is created, and setting is made so as to indicate the process created by the "INDEX", element of "Evaluation data" (step S117). If the definition ID of "Evaluation data" is equal to the set value when "Evaluation data" indicates the process in step S116 (step S118), this means that an attempt is made to set a different definition ID from the already-set definition ID, and therefore an error is detected.

Figure 10:
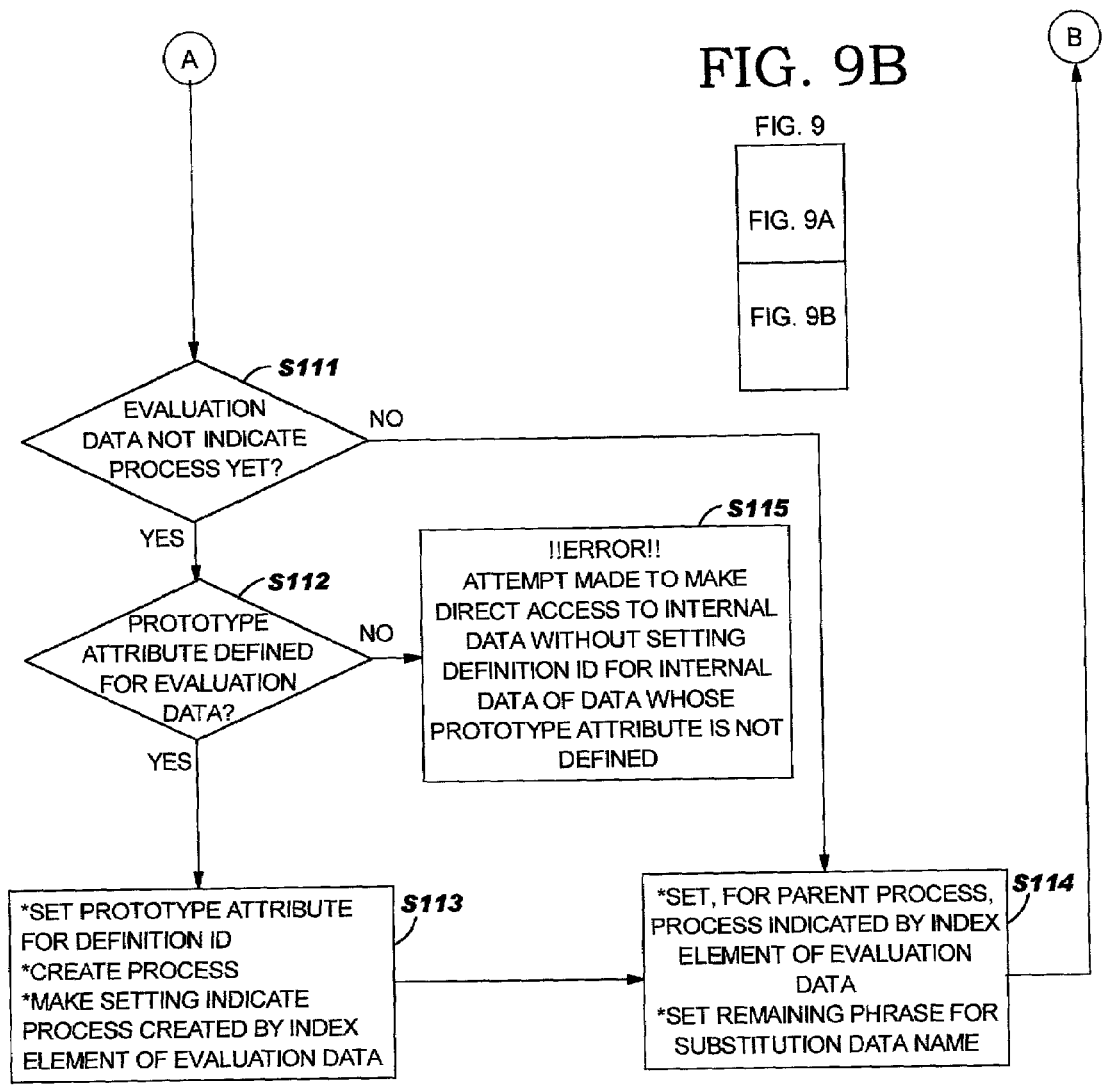
FIG. 10 is a table of an example of a status obtained by the process storage as the result of evaluation of the data shown in FIG. 8.

FIG. 10 is a table of an example of a status obtained by the process storage 37 as the result of evaluation of all the data shown in FIG. 8. In this case, the results of evaluation can be obtained according to the entries, that is, the definition ID, the process ID, the parent process, the activity, the executing user, the data, and the number of child processes for identifying the project. For example, when the person in charge A terminates the operation of the activity, a request to terminate the operation is sent to the client request management program 33 of the workflow server 30. The client request management program 33 calls the process management program 32, fetches the process of "definition C: C001" from the process storage 37, fetches the workflow definition of the project "definition C" from the workflow definition storage 35, and thus makes a flow evaluation.

Figure 11:
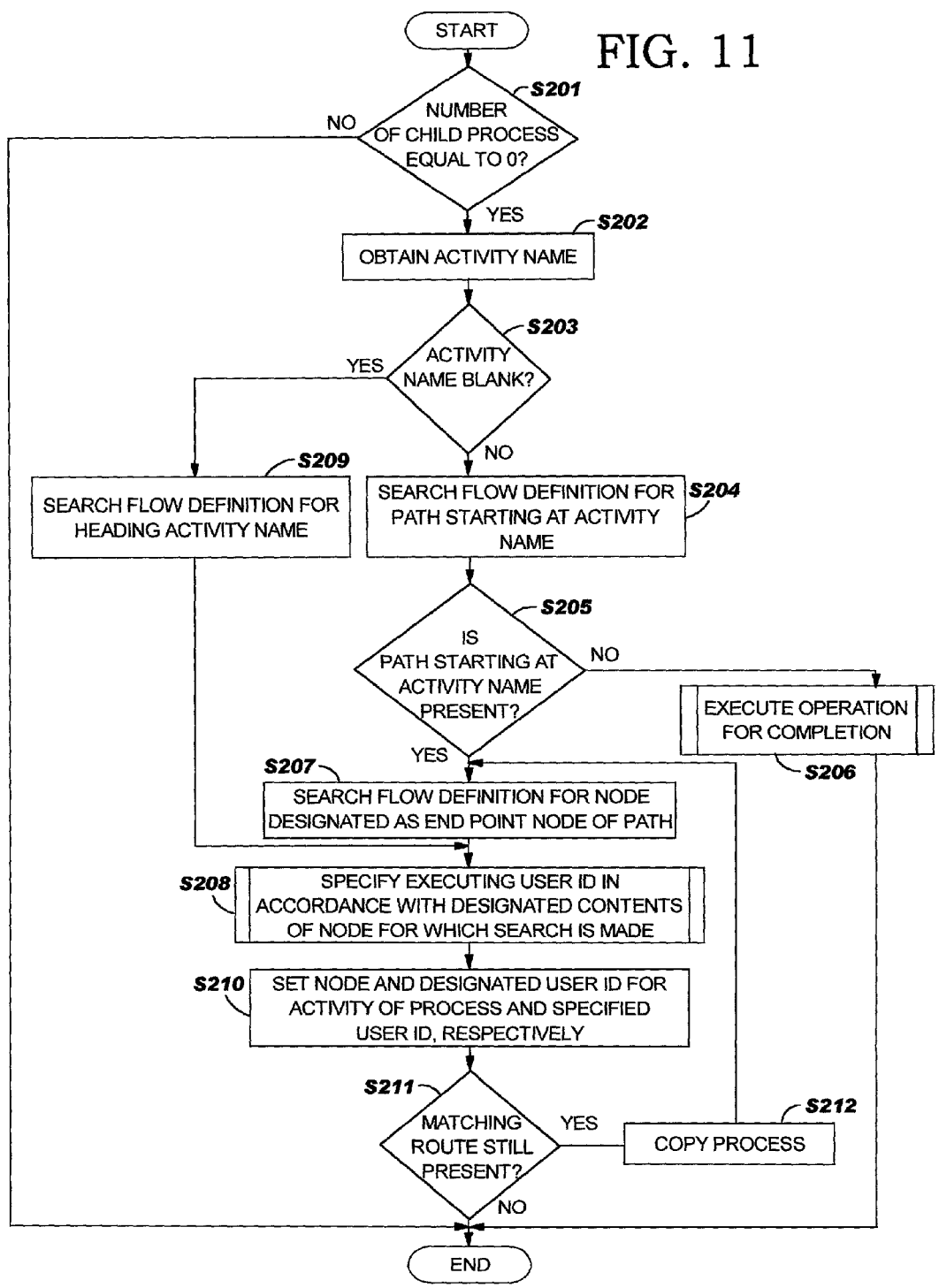
FIG. 11 is a flowchart of a procedure of a flow evaluation.

FIG. 11 is a flowchart of a procedure of the flow evaluation of the exemplary embodiment. In the procedure of the flow evaluation, whether or not the number of child processes is equal to zero is first judged in the status of the process storage 37 shown in FIG. 10 (step S201). When the number of child processes is not equal to zero, the operation of the procedure of the evaluation ends. When the number of child processes is equal to zero, an activity name is obtained (step S202). At this time, whether or not the activity name is blank is judged (step S203). When the activity name is not blank, the workflow definition storage 35 is searched for a path starting at the activity name (step S204).

Then, the presence or absence of the path starting at the activity name is judged (step S205). When the path starting at the activity name is absent, an operation for completion is executed (step S206) and thus the operation ends. When the path starting at the activity name is present, a flow definition is searched for a node specified as an endpoint node of the path (step S207), and an executing user ID is specified in accordance with the contents of designation of the node for which the search is made (step S208). When the activity name is blank in step S203, the workflow definition storage 35 is searched for the heading activity name (step S209), and the operation goes to step S208. After step S208, the node and the specified user ID are set for the activity of the process and the operating user ID, respectively (step S210). Then, whether or not another matching route is present is judged (step S211). When another matching route is present, the process is copied (step S212), and the operation returns to step S207. When another matching route is not present, the operation for the procedure of the flow evaluation ends.

Figure 12:
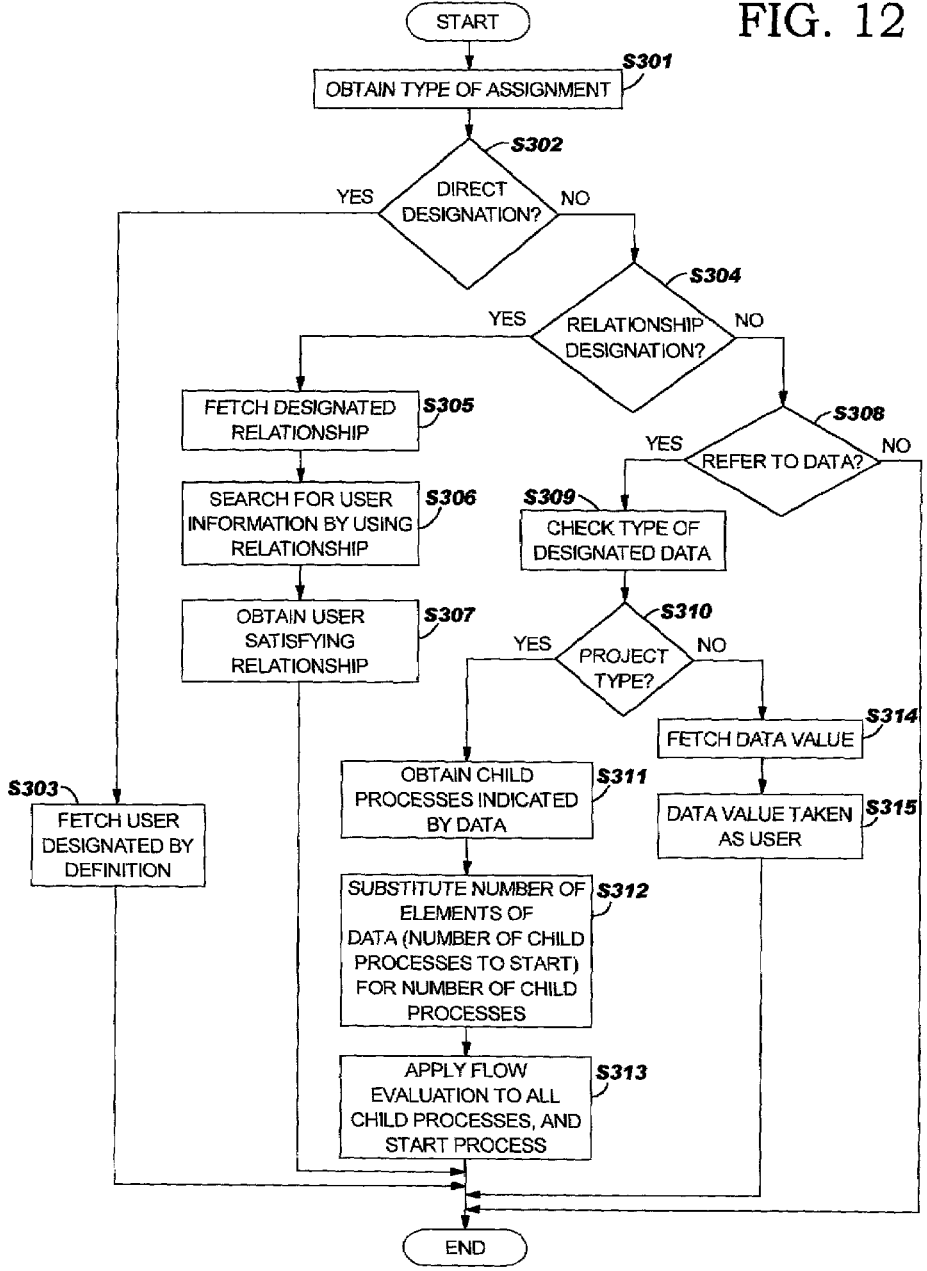
FIG. 12 is a flowchart of a procedure for assigning an executing user.

FIG. 12 is a flowchart of a procedure for assigning an executing user. First, the type of assignment is obtained (step S301), and whether or not the type is the direct designation is judged (step S302). When the type is the direct designation, a user designated by the definition is fetched (step S303), and the operation for the procedure for assigning the executing user ends. When the type is not the direct designation, the procedures vary according to whether or not the type is the relationship designation (step S304). When the type is the relationship designation, a designated relationship is fetched (step S305). Then, a search is made for the user information by using the relationship (step S306). Then, a user satisfying the relationship is obtained (step S307). Then, the operation of the procedure for assigning the executing user ends.

When the type is not the relationship designation in step S304, a judgment is made as to whether or not data is referred to (step S308). When data is not referred to, the operation of the procedure for assigning the executing user ends. When data is referred to, the type of designated data is checked (step S309). The following operations vary according to whether or not the data type is the project type (step S310). That is, when the data type is the project type, child processes indicated by the data are obtained (step S311), and the number of elements of the data (the number of child processes to be started) is substituted for the number of child processes (step S312). Then, the flow evaluation is applied to all the child processes, and the process is started (step S313). Then, a series of operations ends. When the data type is not the project type, a data value is fetched (step S314). The data value is taken as a user (step S315). Then, the operation for the procedure for assigning the executing user ends.

Figure 13:
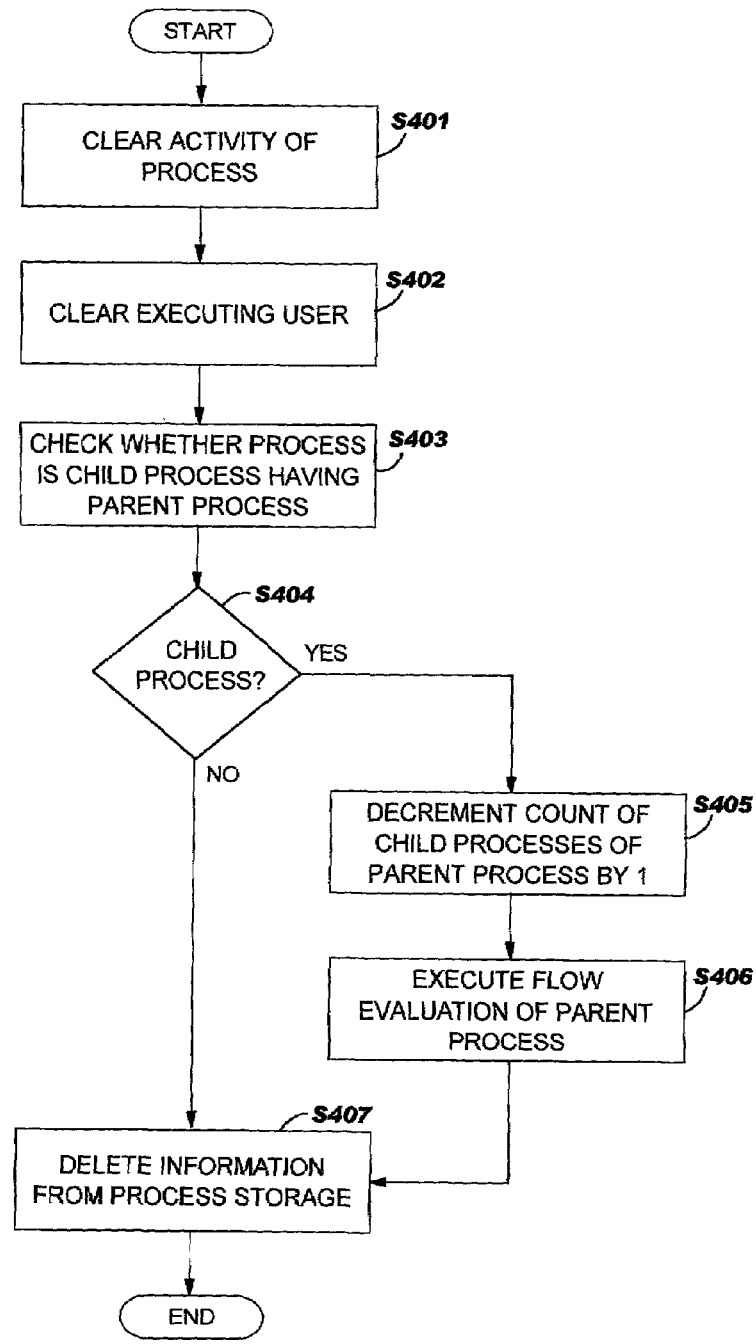
FIG. 13 is a flowchart of a procedure for a completion operation.

FIG. 13 is a flowchart of a procedure for the completion operation of the exemplary embodiment. In the completion operation, first, the activity of the process is cleared (step S401), and the executing user is cleared (step S402). Then, a check is made as to whether or not the process is the child process having the parent process (steps S403 and S404). When the process is the child process, the count of the child processes of the parent process is decremented by one (step S405), and the flow evaluation of the parent process is executed (step S406). Finally, the information is deleted from the process storage 37 (step S407), and the completion operation ends. When the process is not the child process, the information is deleted from the process storage 37 (step S407), and the completion operation ends.

FIG. 14 is a table of a status of the process storage 37 obtained by the execution of the operations shown in FIGS. 11, 12 and 13. The status shown in FIG. 10 is changed to the status shown in FIG. 14 by the operations shown in FIGS. 11 to 13. In the status shown in FIG. 14, the child process "definition A: A001", the child process "definition A: A002" and the child process "definition B: C001" are assigned to a person in charge who has the user ID "soumu", a person in charge who has the user ID "keiri" and a person who has the user ID "eigyou", respectively. In other words, the three child processes are executed in parallel. When the assigned user logs on the workflow system the user may learn of the activity which he or she is assigned to as the executing user, and the user may then execute the activity. For example, when the person in charge who has the user ID "soumu" terminates the activity, the process "definition A: A001" is assigned to his or her superior.

Figure 15:
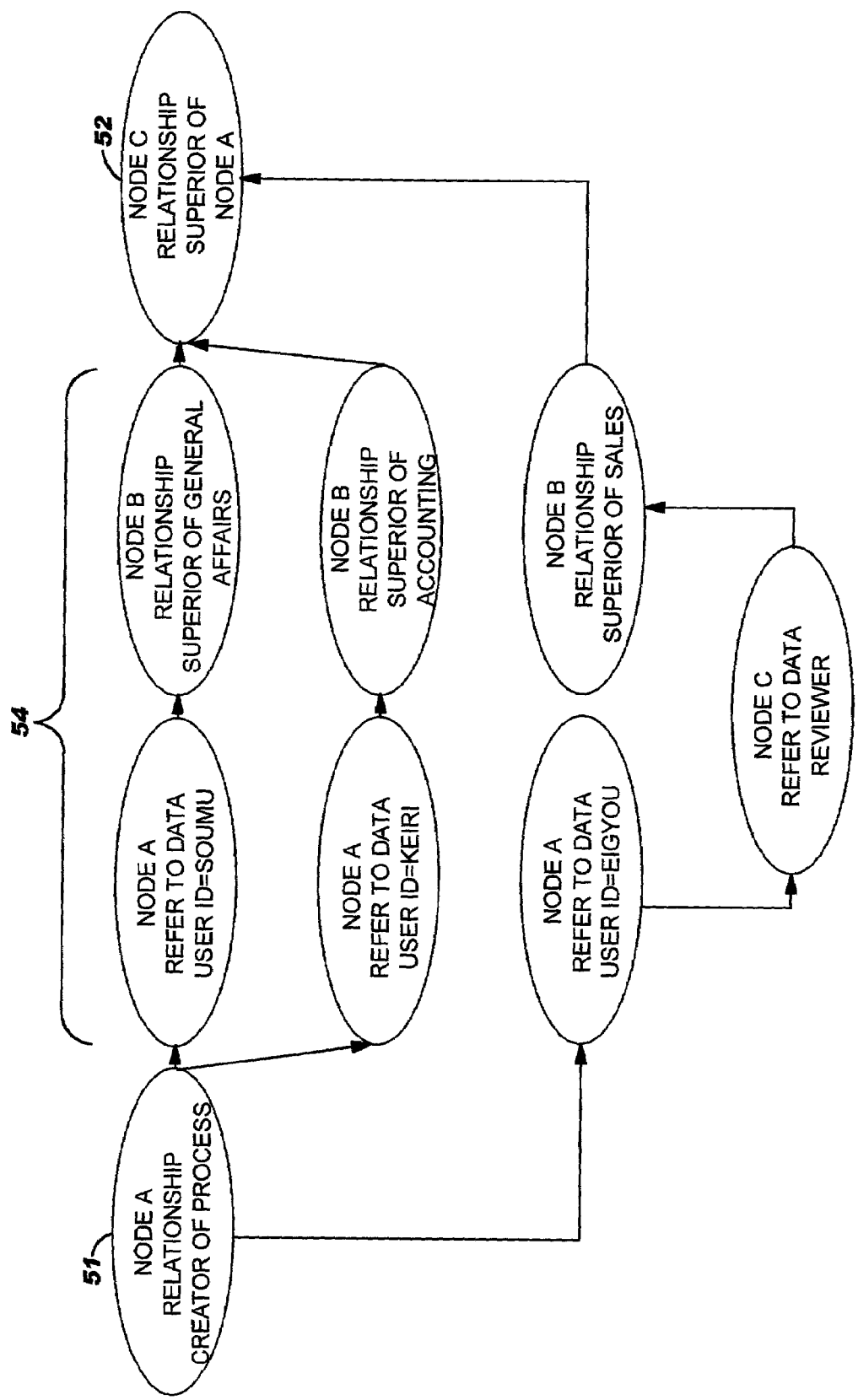
FIG. 15 is an illustration of the whole process flow.

FIG. 15 is an illustration of the whole process flow of the above-mentioned examples. In the process flow, in the project "definition C" shown in FIG. 5, the activity of the Node B is enabled, and the processes are substituted by the processes indicated by the project type data Depts[1] to Depts[3]. In other words, a parallel route formed of two routes of the definition A and a route of the definition B is multiplexed and treated as one node, and thus a kind of node 54 formed of three sub-routes can be executed between the typical nodes 51 and 52.

FIG. 16 shows the case where other data is designated as the data of "Route to:" shown in FIG. 7. As in the case described with reference to FIG. 8, the data shown in FIG. 16 is transmitted to the client request management program 33. In this case, Depts[1] to Depts[4] are treated as the project array type data. Depts[1] and Depts[2] are set as "definition B", Depts[3] and Depts[4] are set as "definition A", and Depts[1]. UserID to Depts[4]. UserID are set as User 1 to User 4.

Figure 17:
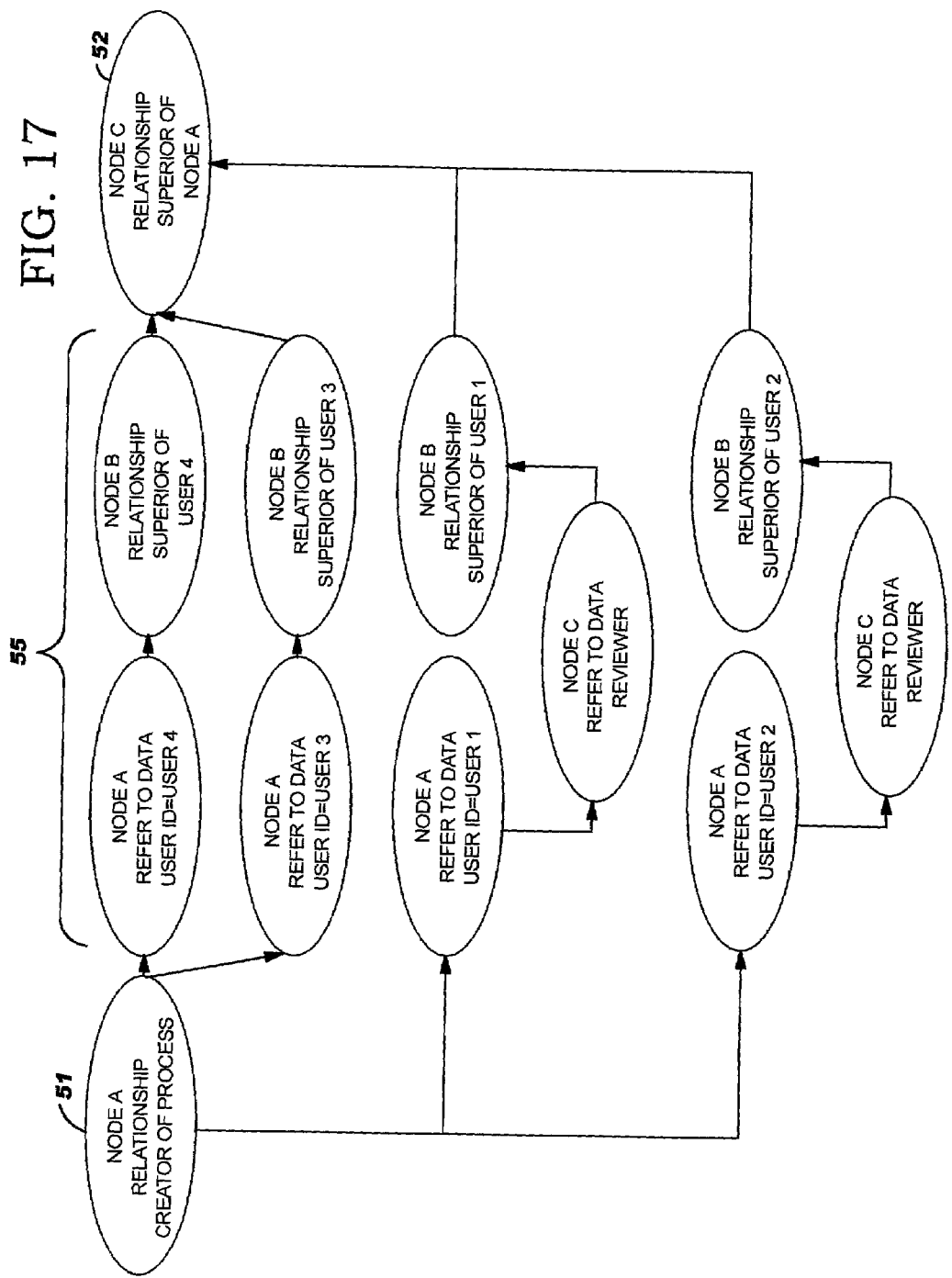
FIG. 17 is an illustration of the whole process flow in the case where the data shown in FIG. 16 is designated as "Route to:".

FIG. 17 is an illustration of the whole process flow in the case where the data shown in FIG. 16 is designated as "Route to:". In the project "definition C" shown in FIG. 5, the activity of the Node B is enabled, and the processes are substituted by the processes indicated by the project type data Depts[1] to Depts[4]. In other words, a parallel route formed of two routes of the definition A and two routes of the definition B are multiplexed and treated as one node, and thus a kind of node 55 formed of four sub-routes can be executed between the typical nodes 51 and 52.

In the exemplary embodiment, the above operations are performed so that the project type and the array thereof may be defined as data that can be defined by the data definition. Moreover, the definition ID of the previously-designated project, which is called the prototype attribute, may be designated as the attribute of the project type data. When a process is created, a data set is created in accordance with the data definition of a project in which the process is defined, and the data set is stored in the process storage 37. The value of the data created as mentioned above can be set on the screen linked to each node.

The data defined as the project type has the definition ID added thereto as described above. When the definition ID of the project is designated, a new data set is created in accordance with the data definition of the designated project. After that, the new data can be set and referred to. Even if the definition ID of the project is not particularly designated, the definition ID is set for the prototype attribute, whereby the data set can be automatically created at the time when the data is referred to or set for the first time in accordance with the prototype attribute, that is, the data definition of the project. Therefore, it is not necessary to explicitly designate the definition ID.

When data is the array data, as many definitions ID of the projects as necessary elements are designated, whereby data of a plurality of projects can be treated as one data. Also when the prototype attribute of the array data is set, the data set is automatically created for the array elements at the time when a value is referred to or set for the first time.

Immediately after the creation of the process or after the end of the activity, a node to be enabled next is found in accordance with the workflow definition. When a person in charge is assigned to the node to be enabled, an operation is assigned to the person in charge. When the node is defined so as to refer to data, a person in charge is identified by using a value indicated by the data, whereby the person in charge assigns to an operation. When the node is defined so as to refer to the project type data, a child process is created from another workflow definition indicated by the data, and thus the child process itself is taken as the activity of the node. At this time, an actual person in charge of the operation can evaluate and determine the head node of the child process. Furthermore, when the node stores the project type data as the array, child processes are created for all elements of the array, and thus the child processes themselves can be taken as the activity of the node. In a group of child processes created by referring to the array, the activity of the node of the parent process ends when all the child processes are completed.

As described above, according to the exemplary embodiment, the route definition designates a project variable as the node, whereby a sub-route can be dynamically changed. Moreover, an array type variable is designated as the project variable, whereby a synchronous type parallel route can be multiplexed and treated as one node. In other words, since a substantial route definition designates only the project variable as the node, user operation can be greatly simplified and therefore adaptation can be easily made to a change in organizations, or the like. Moreover, a person in charge, that is, a slip submitter, only designates on a slip the departments which should give an approval, thereby facilitating designing a slip or the like for use in a circular to be sent around for approval of a decision, which can concurrently ask for approval of a plurality of departments.

Note that the programs for executing the workflow described by referring to the embodiment are stored in a storage medium that is commercially available. A typical storage medium is a medium such as a CD-ROM storing software for executing the processing of the programs. In the case where the program is downloaded through the Internet or the like, it is the case, needless to say, that the storage media also include a medium of a program transmitting apparatus and a storage medium such as a hard disk storing the downloaded program. The programs stored in the above-mentioned storage media can be read by, for example, a CD-ROM driver functioning as inputting means. For example, the program transmitting apparatus may satisfactorily comprise interface means (transmitting means) which can supply a program capable of realizing the embodiment in response to a download request from a computer terminal connected to the Internet.

As described above, according to the present invention, the design of a complicated workflow can be realized by a simple definition.

Although a preferred embodiment of the present invention has been described in detail, it should be understood that various changes, substitutions and alternations can be made therein without departing from spirit and scope of the inventions as defined by the appended claims.

We claim:

1. A workflow system comprising:
   manipulating computer terminals, for executing a workflow between persons in charge, said manipulating computer terminals being connected to a network;
   a designing computer terminal for designing said workflow by designating project variables for multiplexing a plurality of processes for nodes, each process indicating a unit of operations to be handled; and
   a workflow server for managing said warkflow designed by said designing computer terminal, and accessing said manipulating computer terminals in accordance with activities that indicate operations assigned to said nodes,
   wherein the workflow server is coupled to both the designing computer terminal and the manipulating computer terminals through the network,
   wherein a designer at the designing computer terminal uses the designing computer for arranging the nodes and connecting the nodes by paths such that said nodes and paths determine a workflow definition that determines a processing order of the nodes, wherein the designer uses the designing computer for prescribing a data definition relating to the workflow definition and for prescribing attributes of the nodes and of the paths wherein a project created by a designer at the designing computer terminal is registered in the workflow server, wherein the workflow server comprises programs and storages, wherein the programs comprise a project management program, a process management program, a client request management program, and a user management program, wherein the storage comprise a workflow definition storage, a data definition storage, a process storage, a workflow status storage, and a user information storage, wherein the project management program causes the workflow definition storage and the data definition storage to respectively retain data on the workflow definition and the data definition defined by the designer using the designing computer terminal, wherein the process management program manages a first process created by using a definition of the project, said first process having a definition ID and a process ID, said process ID being for identifying the plurality of processes created by the definition of the project, wherein the client request management program includes functions for providing a person in charge who uses the manipulating computer terminals with a list of activities that are assigned to the person in charge and for honoring a request to terminate an activity assigned to the person in charge, and wherein the user management program controls an authorization of the person in charge to participate in the workflow system, registers user information in the user information storage, and makes access to the user information as the user information is needed.

2. The workflow system according to claim 1, wherein said manipulating computer terminals inform said workflow server of termination of activities after execution of assigned operations; and said workflow server completes the process after the termination of all activities of said workflow.

3. The workflow system according to claim 1, wherein the designing computer terminal includes functions for designing said workflow, wherein the designing computer terminal further includes definition functions for realizing duty processing by the workflow system, and wherein the duty processing is defined by a designer who uses the designing computer terminal for designing theworkflow to design a flow of operations of duties to be performed and a data structure for use in said operations of duties to be performed.

4. The workflow system according to claim 3, wherein the attributes of the nodes are selected from the group consisting of the names of the nodes, persons in charge of the nodes, and a relationship designation defined by a relationship between users of the nodes.

5. The workflow system according to claim 3, wherein the attributes of the paths include conditions for enabling the paths.

6. The workflow system according to claim 1, wherein a first node of said nodes is adapted to generate and execute child processes as an activity of said activities by using a definition of a project referred to by the first node.

7. The workflow system according to claim 6, wherein the first node is adapted to circulate data to different users or departments by separately setting IDs of the child processes.

8. The workflow system according to claim 7, wherein the IDs of the child processes are linked to variable IDs of array elements of a variable by an input tag, and wherein data values set to data in the variable IDs are adapted to be substituted into a form.

9. The workflow system according to claim 8, wherein the first node refers to a project type array associated with the project, wherein the number of said child processes is equal to the number of array elements, and wherein the first node is adapted to execute the child processes in parallel.

10. The workflow system according to claim 9, wherein project type data relating to said project type array facilitates reuse of a workspace definition and data definition of another project.

* * * * *

UNITED STATES PATENT AND TRADEMARK OFFICE
CERTIFICATE OF CORRECTION

PATENT NO. : 6,985,938 B2
DATED : January 10, 2006
INVENTOR(S) : Ohsaki et al.

It is certified that error appears in the above-identified patent and that said Letters Patent is hereby corrected as shown below:

<u>Title page,</u>
Item [56], References Cited, FOREIGN PATENT DOCUMENTS, delete "PUPA 10-1777608" and insert -- PUPA 10-177608 --.

<u>Column 16,</u>
Line 55, delete "warkflow" and insert -- workflow --.

<u>Column 17,</u>
Line 13, delete "storage" and insert -- storages --.

<u>Column 18,</u>
Line 8, delete "theworkflow" and insert -- the workflow --.

Signed and Sealed this

Twenty-first Day of March, 2006

JON W. DUDAS
*Director of the United States Patent and Trademark Office*